(No Model.)

G. T. CROBARGER.
CULTIVATOR SHOVEL.

No. 604,205. Patented May 17, 1898.

Witnesses.
S. R. Peters.
G. B. Lawton.

Inventor.
Geo. T. Crobarger.

UNITED STATES PATENT OFFICE.

GEORGE T. CROBARGER, OF NEWTON, KANSAS.

CULTIVATOR-SHOVEL.

SPECIFICATION forming part of Letters Patent No. 604,205, dated May 17, 1898.

Application filed January 20, 1896. Serial No. 576,227. (No model.)

*To all whom it may concern:*

Be it known that I, GEORGE T. CROBARGER, a citizen of the United States, residing at Newton, in the county of Harvey and State of Kansas, have invented a new and useful Cultivator-Shovel, of which the following is a correct description.

The present invention relates to plows, and more particularly to that class known as "shovel-plows," the object of the said invention being to provide cultivators with shovels whose points are adjustable and interchangeable and whose points and standards are of various widths and sizes for the purpose of accomplishing the greatest variety of work in cultivation. I attain these objects by the mechanism illustrated in the accompanying drawings, in which—

Figure 1:
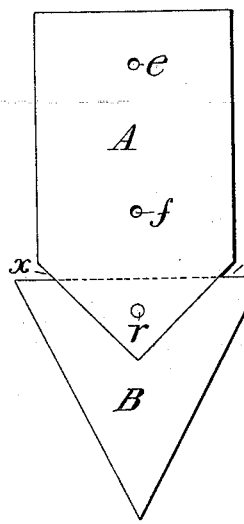
Figure 2:
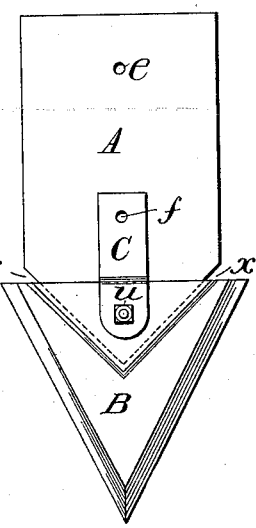
Figure 3:
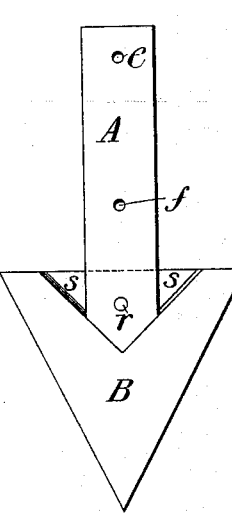
Figure 4:
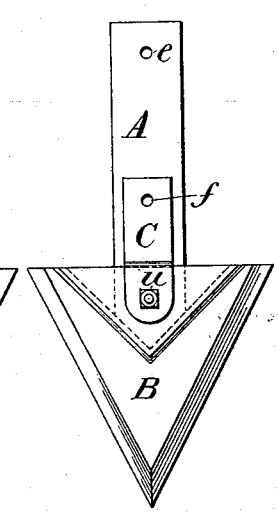
Figure 5:
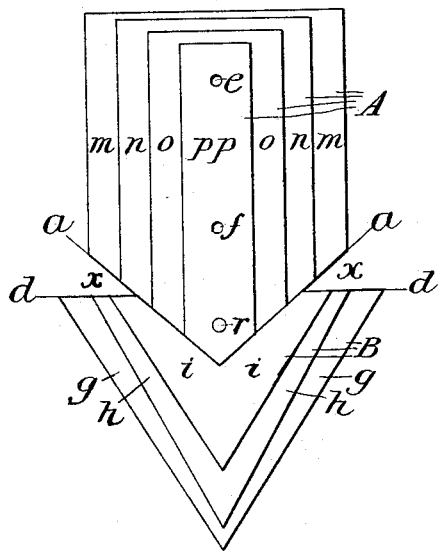
Figure 6:
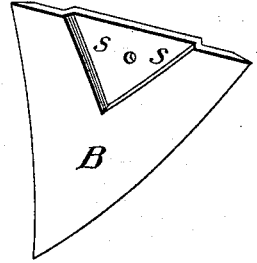
Figure 7:
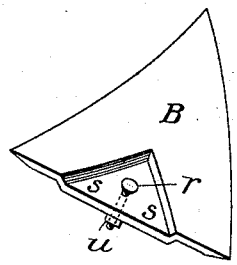

Figure 1 is a front plan view of an ordinary-sized shovel. Fig. 2 is a rear plan view of same. Fig. 3 is a front plan view of a narrow standard or "bull-tongue" shovel. Fig. 4 is a rear plan view of the same. Fig. 5 is a front view of all sizes of shovel standards and points, showing their interchangeable adaptations. Fig. 6 is a perspective view of the point in working position. Fig. 7 is an inverted view of the point and bolt.

Similar letters refer to similar parts throughout the several drawings.

A indicates the upper part or standard of the shovel, and B indicates the point thereof, held in position by the bolt or rivet *r*.

C is a rear extension or reinforcing-brace fastened immediately upon the back of the standard or forming a part thereof, extending downward behind the point B, and terminating at its lower end like a washer between the nut *u* and the point B. The socket *s s* of the point B coincides in depth and in the slope and angle of its two sides with the pointed lower ends of each-sized standard, as shown by the corresponding lines of Fig. 5, so that the standards *m m*, *n n*, *o o*, and *p p* may severally be united to form a shovel with any size point, as with *g g*, *h h*, and *i i*, uniting at their front faces on the lines *a a*, forming dissimilar tools, as shown by contrasting Figs. 1 and 3.

The unfilled portions of the socket *s s*, as shown in Fig. 3, may or may not be filled out, as the earth glides readily over the top of the point B in either case, and also the vacancies *x x* may or may not be filled out by cutting the wide standard A accordingly.

As this shovel can be readily fastened to plow-stocks and suitable fastenings of any class, I deem it unnecessary to illustrate such fastenings.

As the length of this shovel is renewed whenever a new point is put on, it may be made much shorter than the ordinary shovel when manufactured.

The points and the wider standards of my shovel are made of the ordinary slab-steel used in making shovel-plows. The narrowest standards are made of thicker material or cast and of rods properly flattened at their lower ends. Ordinary cultivation is obtained by the use of the wider standards. When the narrower standard is used, the tool is novel, dispensing with the necessity of a cultivator-shield between it and the young plants. Said tool runs light and extremely close to the plants, moving a portion of the dirt sidewise up to the plants and dropping the rest immediately back over the top of the points. The same tool provides a system of level cultivation and permits the free escape of all trash.

The top of the socket *s s* is open, and its two side walls lean from each other slightly, and, extending obliquely across the point, they meet at the center of the point, forming a triangular socket. The lower ends of the different forms and sizes of standards are all shaped to fit against the side walls and the floor of the socket.

It is not essential to my invention that the socket *s s* shall be of the exact outline as described, but it may be of any similar shape located in the same region of the point as described.

The bolt or rivet *r*, passing through the lower hole of the standard and the hole of the point, when tightened by the nut *u* or otherwise, forces the standard, like a wedge, between the side walls of the socket *s s* and against the floor thereof, making the joint between the standard and the point absolutely rigid in all directions.

It will be seen by a front view of my shovel that the dirt is no sooner severed and started by the blacksmithed point until it is caught up low down on the shovel by the hard factory-tempered standard and conveyed away with the least friction, or when the narrowest standard is used the dirt is not much elevated, but breaks against said standard and is thoroughly pulverized about the point.

As the rear construction of my shovel presents no rear interference, the point may be well worn before being replaced.

I am aware that prior to my invention cultivator-shovels have been made in sections or parts; but I am not aware that any of such shovels were constructed with a socket in the upper and front central region of the point into which the standard was secured or into which socket it was designed to insert and use interchangeable standards of various forms and sizes.

Having thus described my invention, I claim as new and desire to procure by Letters Patent—

1. In shovels for plows or cultivators, the shovel constructed of standard and point, with the standard extending downward into the wedge-shaped socket $s\ s$ formed in the upper and front central region of the point and secured by the bolt $r$ and the nut $u$ as set forth.

2. In shovels for plows or cultivators, the combination of the standards A and the points B, the standards secured against the floor and between the side walls of the socket $s\ s$, the point extending at its upper edge laterally on both sides, beyond the standard, and the narrow-size standard reinforced by rear extension C as substantially described and for the purposes set forth.

GEO. T. CROBARGER.

Witnesses:
S. R. PETERS,
G. B. LAWTON.